(12) United States Patent
Pelletier

(10) Patent No.: US 11,121,861 B2
(45) Date of Patent: Sep. 14, 2021

(54) METHOD AND DEVICE TO PRODUCE A SECURE HASH VALUE

(71) Applicant: Nagravision S.A., Cheseaux-sur-Lausanne (CH)

(72) Inventor: Hervé Pelletier, Attalens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 6 days.

(21) Appl. No.: 16/485,803

(22) PCT Filed: Feb. 13, 2018

(86) PCT No.: PCT/EP2018/053475
§ 371 (c)(1),
(2) Date: Aug. 14, 2019

(87) PCT Pub. No.: WO2018/149794
PCT Pub. Date: Aug. 23, 2018

(65) Prior Publication Data
US 2020/0136810 A1    Apr. 30, 2020

(30) Foreign Application Priority Data
Feb. 14, 2017   (EP) ..................................... 17155950

(51) Int. Cl.
*H04L 9/06*   (2006.01)
*G06F 7/544*  (2006.01)
(Continued)

(52) U.S. Cl.
CPC ............ *H04L 9/0643* (2013.01); *G06F 7/544* (2013.01); *G06F 7/548* (2013.01); *G06F 7/556* (2013.01)

(58) Field of Classification Search
CPC ... H04L 9/0643; H04L 9/3236; H04L 9/3239; G06F 7/544; G06F 7/556
See application file for complete search history.

(56) References Cited

U.S. PATENT DOCUMENTS 8,788,263 B1 *  7/2014  Richfield .............. G06F 16/951
                                              704/9
2005/0081041 A1   4/2005  Hwang
(Continued)

OTHER PUBLICATIONS

Zheng-Wei Hu el al: "Pipeline Design of Transformation between Floating Point Numbers Based on IEEE754 Standard and 32-bit Integer Numbers", Intelligent Information Technology and Security Informatics, 2009. IITSI '09. Second International Symposium On, IEEE, Piscataway, NJ, USA.

(Continued)

*Primary Examiner* — Tongoc Tran
(74) *Attorney, Agent, or Firm* — David P. Owen; Hoyng Rokh Monegier B.V.

(57) ABSTRACT

The generation of hash values become popular with the storage of pin code by an authentication server, since the authentication server knows only the result of the hash function and not the pin code itself. Each time an authentication is requested, a hash function is executed on the received pin code and then compared with the stored reference hash value of the initial pin code. In order to improve the security of the hash value, it is proposed a method to produce a secure hash value (R) from a plaintext (P), said method comprising: —producing a first result (H) using an hash function of the plaintext (P), —obtaining an initial floating value (U0) by converting the first result (H) into a floating number representation of the first value (H), —updating a floating value (Un) by executing at least once a Transcendental function (TF) on the initial floating value (Un−1), —obtaining the secure hash value (R) by mixing the first result (H) with the updated floating value (Un).

8 Claims, 3 Drawing Sheets

(51) Int. Cl.
  *G06F 7/548* (2006.01)
  *G06F 7/556* (2006.01)

(56) References Cited

U.S. PATENT DOCUMENTS

| | | | |
|---|---|---|---|
| 2006/0150153 A1* | 7/2006 | Altman | G06F 21/51 |
| | | | 717/116 |
| 2010/0250966 A1 | 9/2010 | Olson et al. | |
| 2011/0154025 A1 | 6/2011 | Spalka et al. | |
| 2015/0254555 A1* | 9/2015 | Williams, Jr. | G06N 3/0454 |
| | | | 706/14 |

OTHER PUBLICATIONS

IEEE Standards Board, "IEEE Standard for Binary Floating-Point Arithmetic;ANSI/IEEE Std 754-1985", IEEE Standard, IEEE, Piscataway, NJ, USA, Jan. 1, 1985 (Jan. 1, 1985), XP017602479, ISBN: 978-0-7381-1165-0.

Quinnell et al. "Floating-Point Computer Arithmetic", Wiley Encyclopedia of Computer Science and Engineering, Jan. 1, 2008 (Jan. 1, 2008), XP055090691, [retrieved on Nov. 28, 2013].

* cited by examiner

METHOD AND DEVICE TO PRODUCE A SECURE HASH VALUE

INTRODUCTION

The generation of hash values become popular with the storage of pin code by an authentication server, since the authentication server knows only the result of the hash function and not the pin code itself. Each time an authentication is requested, a hash function is executed on the received pin code and then compared with the stored reference hash value of the initial pin code. Therefore, even if the authentication server is compromised and the list of hash values has leaked to a third party, the latter cannot recover the pin code.

BACKGROUND ART

A hash function is any function that can be used to map data of arbitrary size to data of fixed size. The values returned by a hash function are called hash values, hash codes, hash sums, or simply hashes. A data structure is used called a hash table, widely used in computer software for rapid data lookup. Hash functions accelerate table or database lookup by detecting duplicated records in a large file. An example is finding similar stretches in DNA sequences. They are also useful in cryptography. A cryptographic hash function allows one to easily verify that some input data maps to a given hash value, but if the input data is unknown, it is deliberately difficult to reconstruct it (or equivalent alternatives) by knowing the stored hash value. This is used for assuring integrity of transmitted data, and is the building block for HMACs, which provide message authentication. One characteristic of the hash function is the one way function in which, with the result of the hash function, it is considered very difficult (if not impossible) to obtain the initial value.

A cryptographic hash function is a special class of hash function that has certain properties which make it suitable for use in cryptography. It is a mathematical algorithm that maps data of arbitrary size to a bit string of a fixed size (a hash function) which is designed to also be a one-way function, that is, a function which is infeasible to invert. The only way to recreate the input data from an ideal cryptographic hash function's output is to attempt a brute-force search of possible inputs to see if they produce a match. The input data is often called the message, and the output (the hash value or hash) is often called the message digest or simply the digest.

A related application is password verification. Storing all user passwords as cleartext can result in a massive security breach if the password file is compromised. One way to reduce this risk is to only store the hash digest of each password. To authenticate a user, the password presented by the user is hashed and compared with the stored hash. This approach prevents the original passwords from being retrieved if forgotten or lost, and they have to be replaced with new ones. The password is often concatenated with a random, non-secret seed value before the hash function is applied. The seed is stored with the password hash. The authentication server can also have a secret seed that is used with hash function with a seed parameter.

Examples of hash functions are SHA, RIPEMD or MD5.

BRIEF DESCRIPTION

As mentioned above, the hash values can be attacked by brute-force attack. Strong hashing algorithms can slow down brute-force attacks. Essentially, hashing algorithms perform additional mathematical work on a password and other complementary additional data (=plaintext) before storing a value derived from the password on a memory. If a slower hashing algorithm is used, it will require thousands of times as much mathematical work to try each password and dramatically slow down brute-force attacks. However, the more work required, the more work a server or other computer has to do each time as user logs in with their password. Software must balance resilience against brute-force attacks with resource usage.

Brute force attacks rely on large computing capabilities. It is now possible to find a circuit board that takes advantage of the "massively parallel processing" capabilities of a graphics processing unit (GPU)—the processor normally used to produce realistic graphics for video games. With such solution, cracking a password is then accessible within a couple of days.

The method and device proposed by the present disclosure aims at protecting the hash values against these massive brute force attacks using GPU.

According to one embodiment, it is proposed a method to produce a secure hash value (R) from a plaintext, said method comprising:

producing a first result (H) using an hash function of the plaintext, obtaining an initial floating value (U0) by converting the first result (H) into a floating number representation of the first value (H), updating a floating value (Un) by executing at least once a Transcendental function (F) on the initial floating value (Un−1), obtaining the secure hash value (R) by mixing the first result (H) with the updated floating value (Un).

A Transcendental function (F) is a function which is not an algebraic function. In other words, a function which "transcends," i.e., cannot be expressed in terms of, algebra. Examples of transcendental functions include the exponential function, the logarithm function, the trigonometric functions, and the inverse functions of thereof. The floating number representation uses preferably extended precision. On modern CPU such functions are essentially computed with hardware table for a fixed extended precision. Consequently, according to the chip manufacturer, computations results will be slightly different (rounding effect).

BRIEF DESCRIPTION OF THE FIGURES

The present disclosure will be better understood thanks to the attached figures in which.

DETAILED DESCRIPTION

Figure 1:
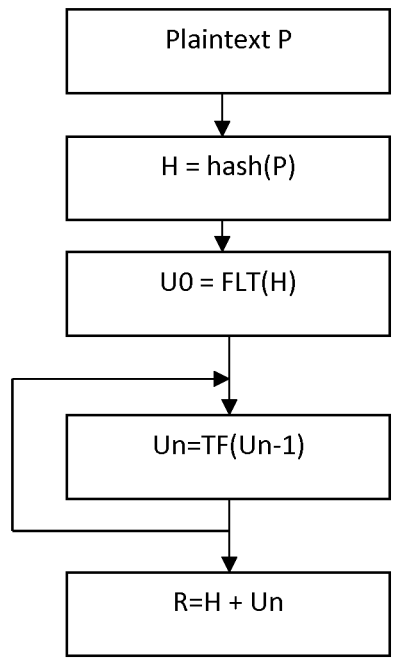
FIG. 1 illustrates the generation of a secure hash value using a transcendental function.

According to the FIG. 1, the steps of the method to produce a secure hash are illustrated. The input message or plaintext P is input into the hash module to produce a conventional hash value H. Known hash algorithms are MD4, SHA-1 to SHA-256 for example. In case that the algorithm uses a seed, the seed is introduced into the module to produce the hash value H.

The next step is the conversion of the binary representation of the hash value H into a floating point number U0. An example is given by the publication IEEE754-2008 describing how to represent an integer into floating point representation. The IEEE 754 standard specifies a binary23 as having:

Sign bit: 1 bit, Exponent width: 8 bits, Significand precision: 24 bits

Double-precision floating-point format is a computer number format that occupies 8 bytes (64 bits) in computer memory and represents a wide, dynamic range of values by using a floating point. Double-precision floating-point format usually refers to binary64, as specified by the IEEE 754 standard. The IEEE 754 standard specifies a binary64 as having:

Sign bit: 1 bit, Exponent: 11 bits, Significand precision: 53 bits (52 explicitly stored)

Figure 5:
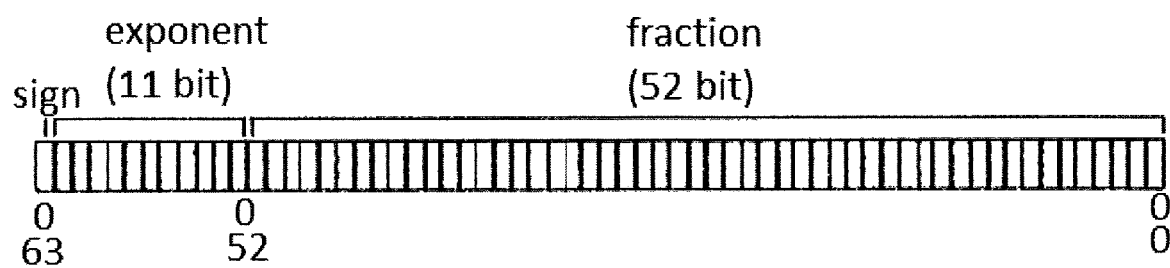
FIG. 5 illustrates a layout of bits.

The format is written with the significand having an implicit integer bit of value 1 (except for special data, see the exponent encoding below). With the 52 bits of the fraction significand appearing in the memory format, the total precision is therefore 53 bits (approximately 16 decimal digits, 53 log 10(2)≈15.955). The bits are laid out as shown in FIG. 5.

The selection of the precision in the conversion step is driven by the capacity of the general purpose processing unit (CPU) to handle floating point numbers versus the graphic processing unit (GPU). In case that the GPU are able to handle 24 bits precision, the precision should be selected to be above that with 32 bit or 64 bits.

The next step is the execution of at least one transcendental function on the floating number U0. Examples of such function types are logarithm, exponentiation, sine, cosine and inverse thereof. A transcendental function (TF) is preferably executed more than one time. The FIG. 1 illustrates the case in which the TF is executed n times, each time the result of the previous TF is applied to the next TF. It is to be noted that the TF does not necessary have to be the same.

The table below, stored in the device calculating the secure hash, is used to determine which TF is to be used.

| Round | Function type |
|---|---|
| 1 | U' = sine(U) |
| 2 | U' = log(U) |
| 3 | U' = cosines(U) |
| 4 | U' = $e^{(U)}$ |

The example above shows that the iterative process has 4 rounds. At each rounds another TF is used. According to the FIG. 1, the result of the previous TF is applied to the next one. The final result of the iterative process is the floating value Un (in our example, n=4).

Figure 2:
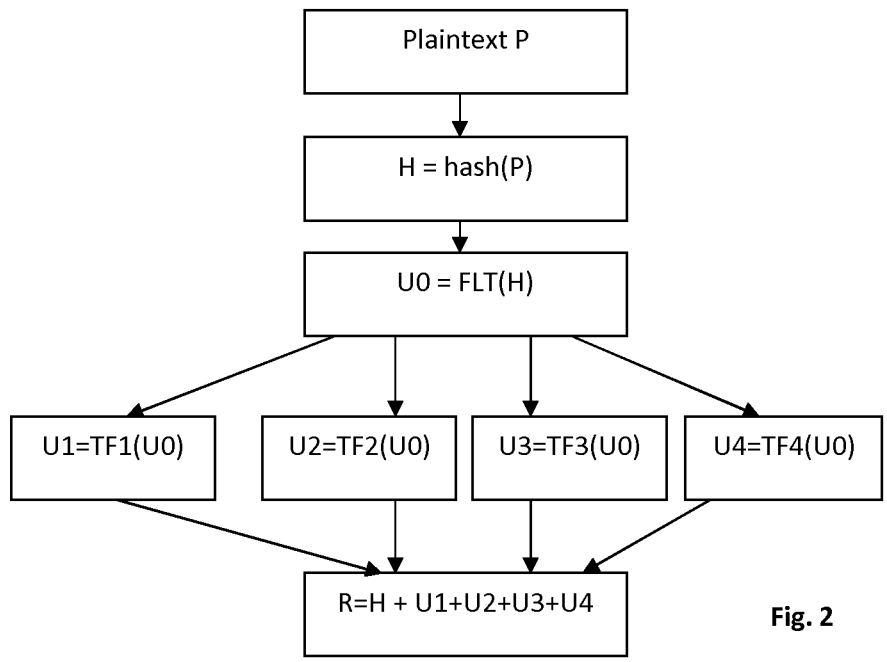
FIG. 2 illustrates a particular case in which several parallel result of the functions are then concatenated.
Figure 3:
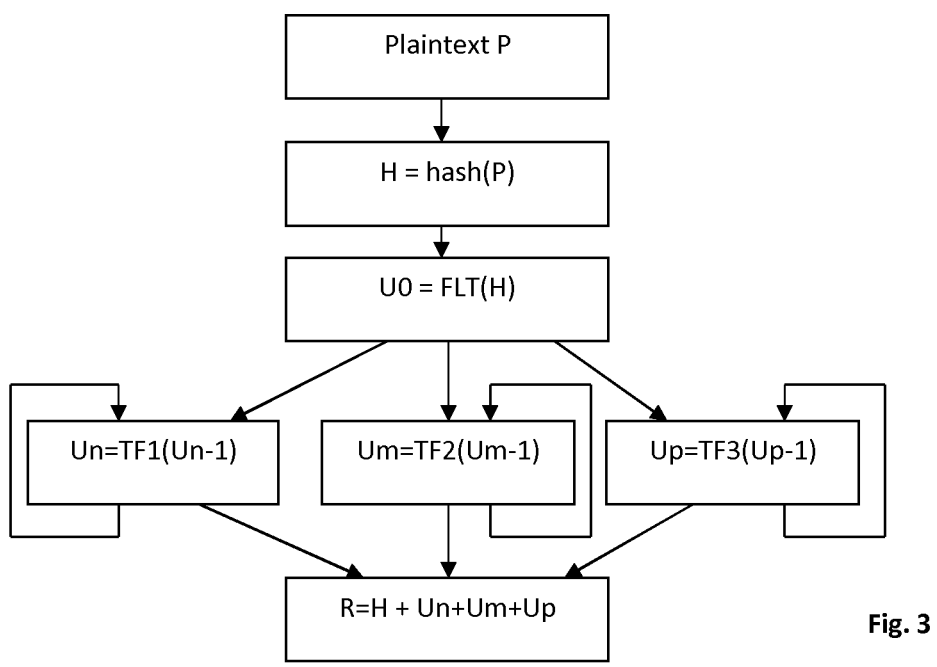
FIG. 3 illustrates the case in which each function are iteratively executed.

According to the example illustrated in FIG. 2, the initial floating value U0 is applied to a plurality of TF modules working in parallel. In the same manner as illustrated in the table above, each module executes a dedicated function TFx. Various implementations can be foreseen in the frame of the present disclosure. A TF module can be dedicated to one particular function, e.g. a cosines function. This function can be applied once or repeated n times as illustrated in FIG. 3, the result of the previous one being applied to the next one.

The module TF can be also structured in the same manner as explained with reference to the FIG. 1. A module TF1 has its own table and executes different TF functions to produce the result of the module (e.g. U1).

| Round | Function TF1 | Function TF2 | Function TF3 | Function TF4 |
|---|---|---|---|---|
| 1 | U' = sine(U) | U' = log(U) | U' = $e^{(U)}$ | U' = sine(U) |
| 2 | U' = log(U) | U' = sine(U) | U' = log(U) | U' = sine(U) |
| 3 | U' = cosines(U) | U' = log(U) | U' = cosines(U) | U' = cosines(U) |
| 4 | U' = $e^{(U)}$ | U' = $e^{(U)}$ | U' = sine(U) | U' = $e^{(U)}$ |

The table above shows for each TF module, the TF functions that will be applied. In this example, each TF module has the same number of rounds but we can define arbitrary that the module TF1 has 6 rounds (n=6 in FIG. 3), the module TF2 has 2 rounds (m=2) and the module TF3 has 4 rounds (p=4). The number of modules and the number rounds per module is a design setting.

Each module produces then a result Un and each of the results U1 . . . Un will play a role to the final secure hash value H. According to a first embodiment, a mixing steps is executed on all results and then mixed with the hash value H. In case that the module TFx produces the result Ux (x=1 . . . 4 in the example above), the device calculates a value Uy=U1|U2|U3|U4. This intermediary value Uy is then mixed with the hash value H to obtain the final secure hash value R (R=Uy|H).

By mixing, it is understood any mathematical operation such as addition, subtraction, multiplication or division. Mixing can be also a Boolean operation such as XOR, XNOR. The same mixing operation applies to the scheme represented in FIG. 1 by mixing the result Un of the TF module with the hash value H to produce the secure hash value R (R=Un|H).

Once produced, the current secure hash value R can be either stored in a memory of the authentication server as reference value Rf if it was determined during the initialization of a user, or used to compare the current secure hash value R with the reference Rf in case that a verification of the user is requested. The memory will also store the user identification, such as the username, together with the secure hash value R.

Figure 4:
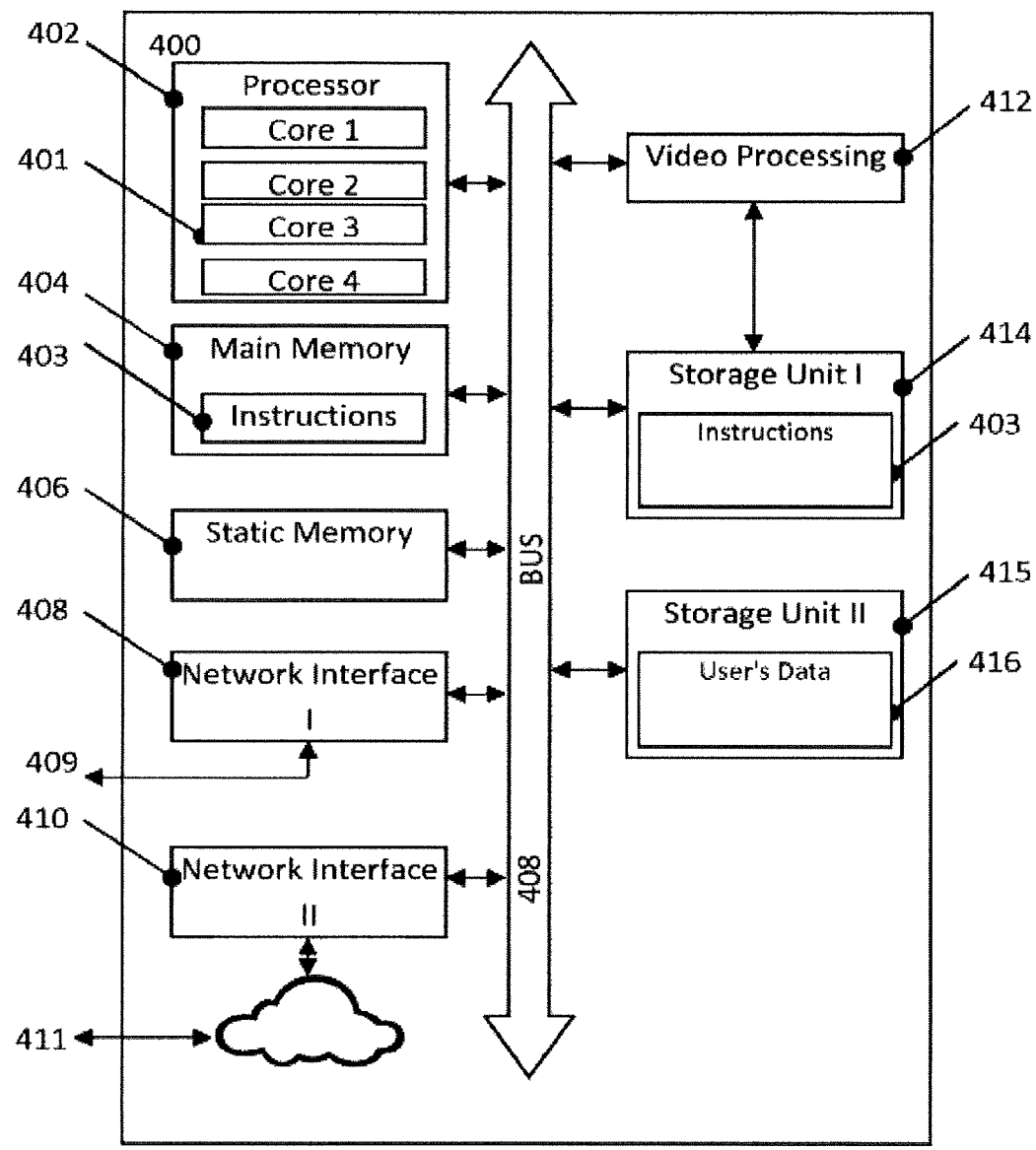
FIG. 4 illustrates one device able to produce a secure hash.

According to one embodiment, the device carrying out the method described above is executed on a multi-code processor. It is a general purpose computing unit (CPU) able to handle floating number with high precision. The scheme illustrated in FIG. 2 can be hardware implemented into different cores. The first function TF1 is designed to be executed on a first core 1 as illustrated in FIG. 4, the function TF2 on a second core Core 2 etc. One core can be dedicated to one specific function, e.g. the exponentiation function, or able to execute any type of functions.

As shown is FIG. 4, a block diagram illustrating components of a Computing Device 400, according to some example embodiments, is able to read instructions from a machine-readable medium (e.g., a machine-readable storage medium) and perform any one or more of the methodologies discussed herein. Specifically, FIG. 4 shows a diagrammatic representation of the Computing Device 400 in the example form of a computer system and within which instructions 403 (e.g., software, a program, an application, an applet, an app, or other executable code) for causing the Computing Device 400 to perform any one or more of the methodologies discussed herein may be executed. In alternative embodiments, the Computing Device 400 operates as a standalone device or may be connected (e.g., networked) to other machines. In a networked deployment, the Computing Device 400 may operate in the capacity of a server machine or a client machine in a server-client network environment, or as a peer machine in a peer-to-peer (or distributed) network environment. The Computing Device 400 may be a server computer, a client computer, a personal computer (PC), a network router, a network switch, a network bridge, or any machine capable of executing the instructions 403, sequentially or otherwise, that specify actions to be taken by that machine. Further, while only a single machine is illustrated, the term "machine" shall also be taken to include a collection of machines that individually or jointly execute the instructions 403 to perform any one or more of the methodologies discussed herein.

The Computing Device 400 includes a processor 402 (e.g., a central processing unit (CPU), a digital signal processor (DSP), an application specific integrated circuit (ASIC), or any suitable combination thereof), a main memory 404, and a static memory 406, which are configured to communicate with each other via a bus 408. The processor 402 can be a single chip or a multi-core processor (Core 1 . . . Core 4). The Computing Device 400 may further include a first Network Interface 408 in communication with other devices.

The Computing Device 400 includes a first storage unit I 414 on which is stored the instructions 403 embodying any one or more of the methodologies or functions described herein. The instructions 403 may also reside, completely or at least partially, within the main memory 404, within the processor 402 (e.g., within the processor's cache memory), or both, during execution thereof by the Computing Device 400. Accordingly, the main memory 404 and the processor 402 may be considered as machine-readable media. The Computing Device 400 further contain a second storage unit II 415 on which is stored the User's Data 416. One example of the User's Data is the user's identification UserID and the reference secure hash value Rf.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the storage unit 414, 415 is shown in an example embodiment to be a single medium, the term "storage unit" should be taken to include a single medium or multiple media (e.g., a centralized or distributed database, or associated caches and servers) able to store instructions.

The instructions 403 may further be transmitted or received over a communications network 409 or 411 using a transmission medium via the network interface device 408 or 410 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A method to produce a secure hash value (R) from a plaintext (P), characterised in that said method comprising:
    producing a first result (H) using an hash function of the plaintext (P),
    obtaining an initial floating value (UO) by converting the first result (H) into a floating number representation of the first value (H),
    updating a floating value (Un) by executing at least once a Transcendental function (TF) on the Initial floating value (Un−1),
    obtaining the secure hash value (R) by mixing the first result (H) with the updated floating value (Un).

2. The method of claim 1, characterised in that the updating further comprises the execution of at least one Transcendental function of a first type (TF1) and at least one Transcendental function of a second type (TF2).

3. The method of claim 2, characterised in that the at least one Transcendental function of a first type (TF1) and the at least one Transcendental function of a second type (TF2) are executed in series, the result of the Transcendental function of the first type (TF1) being applied to the Transcendental function of the second type (TF2).

4. The method of claim 2, characterised in that the at least one Transcendental function of a first type (TF1) and the at least one Transcendental function of a second type (TF2) are executed In parallel, the result of the Transcendental function of a first type (TF1) being mixed with the result of the Transcendental function of a second type (TF2) to obtain the updated floating value (Un).

5. The method of claim 1, characterised in that the secure hash value (R) Is produced on a multi-cores processor, each core producing a single core floating value by executing at least once a Transcendental function (F) on the Initial floating value (UO), further comprising the step of mixing the first result (H) and the results obtained on each core to obtain the secured hash value (R).

6. The method of claim 1, characterised in that the Transcendental function is an exponential function, a logarithm function or a trigonometric function.

7. A Computing Device (400) comprising a processor (402) and a memory (404), said memory comprising an executable program, that, while executed by the processor (402), carries out the method of claim 1.

8. The Computing Device (400) of the claim 7, wherein the processor (402) comprises a plurality of cores (Core 1 . . . Core 4), each core being configured to produce a single core floating value by executing at least once a Transcendental function (F) on the Initial floating value (U0), and further configured to mix the first result (H) and the results obtained on each core to obtain the secured hash value (R).

\* \* \* \* \*